(12) United States Patent
Takahama

(10) Patent No.: US 9,638,554 B2
(45) Date of Patent: May 2, 2017

(54) STRAIN GAUGE HOLDER

(71) Applicant: NUCLEAR ENGINEERING, LTD., Osaka-shi, Osaka (JP)

(72) Inventor: Tsunemichi Takahama, Osaka (JP)

(73) Assignee: NUCLEAR ENGINEERING, LTD., Osaka (JP)

( * ) Notice: Subject to any disclaimer, the term of this patent is extended or adjusted under 35 U.S.C. 154(b) by 283 days.

(21) Appl. No.: 14/398,623

(22) PCT Filed: May 8, 2013

(86) PCT No.: PCT/JP2013/062862
§ 371 (c)(1),
(2) Date: Nov. 3, 2014

(87) PCT Pub. No.: WO2013/168720
PCT Pub. Date: Nov. 14, 2013

(65) Prior Publication Data
US 2015/0135847 A1    May 21, 2015

(30) Foreign Application Priority Data

May 8, 2012 (JP) ................................. 2012-107025

(51) Int. Cl.
*G01D 11/30* (2006.01)
*G01L 1/22* (2006.01)

(52) U.S. Cl.
CPC ............ *G01D 11/30* (2013.01); *G01L 1/2206* (2013.01)

(58) Field of Classification Search
CPC ... G01L 1/2206; G01L 1/2218; G01L 1/2231; G01L 1/2243; G01L 1/26; G01B 7/16;
(Continued)

(56) References Cited

U.S. PATENT DOCUMENTS 1,852,347 A * 4/1932 Getz .................... B67D 3/0029
248/230.9
2,498,696 A * 2/1950 Middaugh ............... B23B 31/00
269/221
(Continued)

FOREIGN PATENT DOCUMENTS

JP  52-115273 A  9/1977
JP  8-101086 A   4/1996
(Continued)

OTHER PUBLICATIONS

International Search Report of PCT/JP2013/062862, mailing date of Jul. 16, 2013 (2 pages).

*Primary Examiner* — Blake A Tankersley
(74) *Attorney, Agent, or Firm* — Westerman, Hattori, Daniels & Adrian, LLP

(57) ABSTRACT

The strain gauge holder 1 includes a holder body 10 on a side surface of a pipe 3, a gauge pressing member 21 for pressing a strain gauge 2 against the side surface of the pipe, and a feed mechanism for giving a pressing force to the gauge pressing member. The guide grooves 12 guide the gauge pressing members. The feed mechanism feeds the gauge pressing member in the guide groove to press the strain gauge 2 against the side surface of the pipe 3. The feed mechanism includes cylindrical portion 32a, bushing 32, and feed screw 31. Each of the feed screws 31 threadedly inserted into the bushing mounted on the holder body is threadedly inserted to feed the gauge pressing member.

6 Claims, 13 Drawing Sheets

(58) Field of Classification Search
CPC .. G01B 7/18; G01B 5/30; G01B 11/16; F16L 3/10; F16L 3/105; F16L 3/1066; F16L 3/1075; F16L 3/1083; F16L 3/1091; B23B 31/00; B23B 31/005; B23B 31/1075; B23B 31/1077; B23B 31/101; B23B 31/1207; B23B 31/16045
See application file for complete search history.

(56) References Cited

U.S. PATENT DOCUMENTS

| | | | |
|---|---|---|---|
| 5,616,847 A | 4/1997 | Schlapfer | |
| 5,646,847 A | 7/1997 | Ratan et al. | |
| 2002/0117587 A1* | 8/2002 | Tenma | F16L 3/1091 248/49 |
| 2008/0087097 A1* | 4/2008 | Nagata | G01L 1/2287 73/761 |
| 2016/0230535 A1* | 8/2016 | Sobolewski | E21B 47/01 |

FOREIGN PATENT DOCUMENTS

| | | | | |
|---|---|---|---|---|
| JP | 2000-329635 A | | 11/2000 | |
| JP | 2002-188970 A | | 7/2002 | |
| JP | 2003-149060 A | | 5/2003 | |
| JP | 2003-166886 A | | 6/2003 | |
| JP | 2003-532094 A | | 10/2003 | |
| JP | 2007-225513 A | | 9/2007 | |
| JP | 2013-234899 | * | 11/2013 | ............... G01L 1/22 |
| WO | 01/84073 A1 | | 11/2001 | |
| WO | 2006/087936 A1 | | 8/2006 | |

* cited by examiner

STRAIN GAUGE HOLDER

TECHNICAL FIELD

The present invention relates to a strain gauge holder.

BACKGROUND ART

A gauge holder for mounting strain gauges on a pipe is disclosed in Patent Document 1 for example. The gauge holder includes a sensor mounting bracket which has already been mounted on a sensor, and a mounting bracket having a mounting belt fixed to the pipe so that the sensor mounting bracket straightly abuts against a surface of the pipe. The mounting bracket is configured such that when a shoulder bolt provided on the sensor mounting bracket is threadedly inserted into a mounting boss provided on the mounting belt, a shoulder of the shoulder bolt abuts against the mounting boss and stops at the boss, and thus a sensor is pressed against an object-to-be-measured under constant pressure. This gauge holder mounts the strain gauge on the pipe under constant pressure without using a torque wrench or the like.

Patent Document 2 discloses a gauge holder including an attachment having two arms which can open and close through a hinge, and fastening means provided on opened and closed ends of the arms and fastening the arms in their closing direction. According to this gauge holder, when the two arms are fastened, sensors mounted on the arms are pressed against a pipe.

Patent Document 3 discloses a gauge holder of a structure in which a U-shaped clamp is mounted on a side surface of a pipe through a fixing screw. This gauge holder includes a sensor at a location where a bottom of the clamp and the side surface of the pipe come into contact with each other.

Patent Document 4 discloses a side surface attaching pressure detecting device which includes two half link-shaped flanges, and the flanges include recesses filled with elastic materials. According to this detecting device, the elastic materials press the sensor against a side surface of the pipe with sufficient force.

Further, Non-Patent Document 1 discloses a sandwich type gauge holder which sandwiches a pipe and a gauge holder which is fixed to a pipe by means of a magnet.

However, the gauge holder disclosed in Patent Document 1 has such a structure that the sensor placed in an axial direction of the pipe is fixed to the mounting belt through the shoulder bolts which are placed at upper and lower locations thereof. Therefore, regions which cannot be measured (regions hidden by the mounting belt) exist at the upper and lower locations of the sensor. Hence, there is a problem that strains cannot be measured in the vicinity of a pipe-welded portion where the pipe is connected by welding and in the vicinity of a bent angle of a bent pipe.

Furthermore, the gauge holder disclosed in Patent Document 1 has a structure using the mounting bracket on which the strain gauge is mounted in advance. Therefore, it is necessary to respectively prepare mounting brackets on which strain gauges suitable for measurement purposes, such as strain gauges for multiaxial measurement, strain gauges for shearing strains and strain gauges for high temperature are mounted. Hence, any commercially available foil strain gauge cannot be mounted as they are, and there is also a problem that general versatility is poor.

Furthermore, when a diameter of the pipe and a diameter of the mounting belt do not match with each other, since the mounting belt is distorted, there is also a problem that strains at the precise two points existing on a diameter of the pipe cannot be measured. Further, in order to secure constant pressing pressure by the shoulder bolt, it is necessary to enhance rigidity of the mounting belt so that the mounting belt does not become deformed. On the other hand, in order to attach the mounting belt to the pipe without plastically deforming the mounting belt, it is necessary to lower the rigidity of the mounting belt. In order to satisfy these two conditions, the mounting belt includes a cut-out at a position forming an angle of about 90° with respect to the mounting bracket. Therefore, the strain gauges cannot be placed at these areas, and there is also a problem that strains cannot be measured at two points forming 90° on the same plane.

The gauge holder disclosed in Patent Document 2 is mounted on a pipe by fastening the arms. Hence, the sensor can be placed even in the vicinity of the pipe-welded portion and in the vicinity of the bent angle of the bent pipe. However, since strains can be measured only at the two points on the diameter of the pipe, there is a problem that strains cannot be measured at two points forming 90° on the same plane.

Furthermore, the gauge holder disclosed in Patent Document 2 has a structure in which the sensor is mounted in a groove provided in the arms. Therefore, it is necessary to prepare in advance a sensor which is suitable for the groove. Hence, any commercially available foil strain gauges cannot be mounted as they are, and there is also a problem that general versatility is poor.

According to the gauge holder disclosed in Patent Document 3, forces pressing the strain gauges act only in an inserting direction of the bolt. Hence, positions where the strain gauges can equally be pressed are only two points located at 90° in a circumferential direction from the bolt, i.e., only two points on the diameter. Therefore, there is a problem that strains cannot be measured at two points forming 90° on the same plane.

Furthermore, the gauge holder disclosed in Patent Document 3 has a configuration of using a sensor in which strain gauges are mounted in advance on a cylindrical fixing member. Hence, any commercially available foil strain gauges cannot be mounted as they are, and in order to use strain gauges desired by a user, time and labor for machining a holder are needed.

The gauge holder disclosed in Patent Document 4 has a structure in which two half ring-shaped brackets are tied on the pipe and mounted thereto through a bolt, and the elastic materials filling the recesses formed inside of a ring press the sensor against the pipe. According to this holder, like the holder of Patent Document 3, a force pressing the strain gauge acts only in an inserting direction of the bolt. Hence, positions where the sensor can equally be pressed are only two points located at 90° in a circumferential direction from the bolt, i.e., only two points on the diameter. Therefore, there is a problem that strains cannot be measured at two points forming 90° on the same plane.

The sandwich type gauge holder disclosed in Non-Patent Document 1 has a problem that the device is large in size, it is difficult to attach the device, and strains cannot be measured at two points forming 90° on the same plane. The magnet type gauge holder disclosed in Non-Patent Document 1 also has a problem that when a plurality of gauges is mounted on the same plane, it is difficult to secure the same pressing pressure.

Further, any of the gauge holders disclosed in Non-Patent Document 1 is a gauge holder for a frictional strain gauge in which a strain gauge is formed on a rigid substrate. Therefore, these gauge holders cannot be applied to a so-called foil strain gauge such as a strain gauge for multiaxial measurement, a strain gauge for a shearing strain and a strain gauge for high temperature.

PRIOR ART DOCUMENTS

Patent Documents

Patent Document 1: Japanese Patent Laid-open Publication No. 2007-225513
Patent Document 2: Japanese Patent Laid-open Publication No. 2003-166886
Patent Document 3: Japanese Patent Laid-open Publication No. 2002-188970
Patent Document 4: U.S. Pat. No. 5,616,847

NON-PATENT DOCUMENT

Non-Patent Document 1: Keishi MORI, Plant Engineer 2011 p 16 to 24

SUMMARY OF THE INVENTION

Problems to be Solved by the Invention

The present invention has been accomplished in view of the above-described background arts, and it is an object of the present invention to provide a strain gauge holder having a simple structure and capable of synchronously measuring strains at a plurality of positions forming about 90° on the same plane.

It is another object of the present invention to provide a strain gauge holder having general versatility and capable of using a commercially available foil strain gauge without using a special mounting bracket unique to a gauge holder regardless of kinds of the foil strain gauges.

Solutions to the Problems

Hence, according to the present invention, a strain gauge holder includes a holder body composed of two or more bracket members and mounted on a side surface of a cylindrical object-to-be-measured, a gauge pressing member for pressing a strain gauge against the side surface of the object-to-be-measured, and a feed mechanism for giving a pressing force to the gauge pressing member, all of the bracket members are coupled to each other through fastening members to form an opening, the object-to-be-measured is positioned in the opening, the holder body is mounted on the object-to-be-measured, the gauge pressing members are fed by the feed mechanism in guide grooves which guide the gauge pressing members provided on at least one of the bracket members, and the strain gauges are pressed against the side surface of the object-to-be-measured.

Effects of the Invention

The present invention provides a strain gauge holder having a simple structure and having a plurality of guide grooves formed at an angle of 90°. Therefore, it is possible to synchronously measure strains at a plurality of positions forming 90° on the same plane. Furthermore, the strain gauge holder of the present invention has the structure in which the gauge pressing members guided in the guide grooves provided in the holder body presses the strain gauges against the side surface of the object-to-be-measured. Therefore, it is only necessary to mount the holder body on condition that the holder body does not naturally drop. Furthermore, it is only necessary that the holder body has rigidity to the extent that the holder body can withstand a force of the feed screw pressing the pressing member. Hence, it is unnecessary that the holder body is made of metal, and the weight of the holder body can be reduced.

Further, the strain gauge holder of the present invention has the structure in which the gauge pressing members are pressed against the side surface of the object-to-be-measured. Therefore, by providing an elastic body on a pressing surface of the gauge pressing member for example, a commercially available foil strain gauge which is smaller than the elastic body can be used as it is. Furthermore, by providing a recess on the pressing surface of the gauge pressing member, it is also possible to use a frictional strain gauge having a rigid substrate. As described above, the strain gauge holder of the present invention has general versatility.

BRIEF DESCRIPTION OF THE DRAWINGS

FIG. 4(a) is a diagram showing a state before a gauge pressing member is pressed;
and FIG. 4(b) is a diagram showing a state after the gauge pressing member is pressed.
FIG. 7(a) is a plan view of the strain gauge holder;
FIG. 7(b) is a front view thereof;
and FIG. 7(c) is a right side view thereof.
FIG. 11(a) is a plan view of the strain gauge holder;
FIG. 11(b) is a front view thereof;
and FIG. 11(c) is a right side view thereof.

EMBODIMENTS OF THE INVENTION

Figure 1:
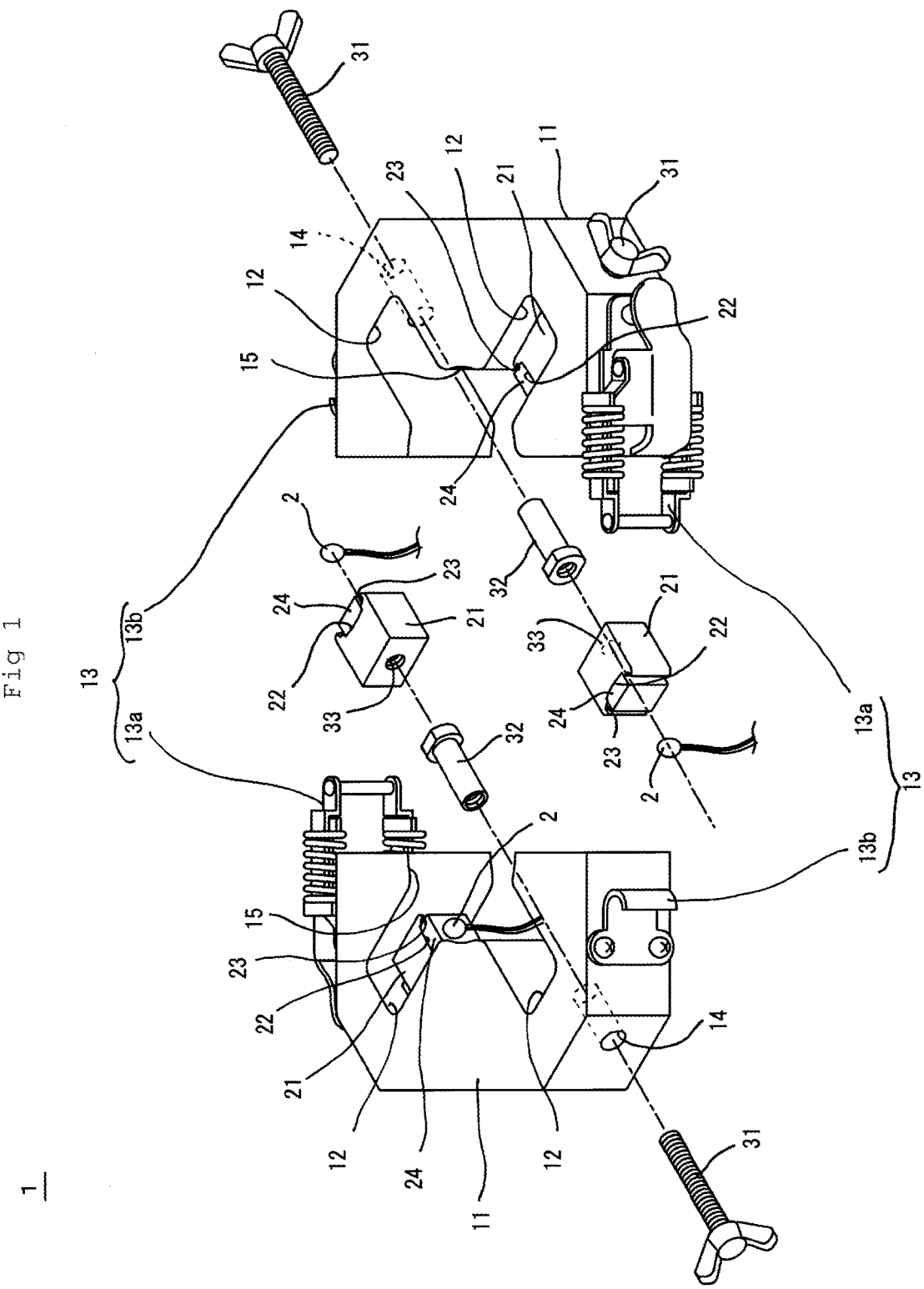
FIG. 1 is an exploded perspective view of a strain gauge holder of an embodiment of the present invention.

A strain gauge holder (simply referred to as a "gauge holder" hereinafter in some cases) of the present invention includes a holder body mounted on a side surface of a cylindrical object-to-be-measured, a gauge pressing member for pressing a strain gauge against the side surface of the object-to-be-measured, and a feed mechanism for giving a pressing force to the gauge pressing member.

Herein, the cylindrical object-to-be-measured not only means a hollow cylindrical object-to-be-measured in a narrow sense, but also means a solid columnar object-to-be-measured in a broad sense. Furthermore, a cross sectional shape of the object-to-be-measured is circular or can be rectangular. The object-to-be-measured can be a pipe, for example.

Herein, the words "strain gauge" is used as a normal meaning used by a person skilled in the art. The strain gauge is a foil strain gauge having a resistor formed on a thin insulative substrate. The strain gauge can also be a frictional strain gauge having a rigid substrate and a resistor which is directly or indirectly formed on the rigid substrate. Herein, the strain gauge is used in a broad sense including both the strain gauges unless otherwise specified.

The holder body is composed of a plurality of bracket members. Each of the bracket members has a mating surface in which an opening is formed when the two or more bracket members are coupled to each other, and the object-to-be-measured is placed in the opening. When mating surfaces are caused to mate with each other and the two or more bracket members are coupled to each other, a flange-shaped holder body having an opening substantially at its central portion is formed. For example, when two bracket members each having a curved mating surface are coupled to each other, the holder body having a circular opening at its central portion is formed. The object-to-be-measured is positioned in the formed opening, and the holder body is mounted on a side surface of the object-to-be-measured.

It is only necessary to mount the holder body so tightly as the holder body does not naturally drop. Herein, to mount the holder body so tightly as the holder body does not naturally drop means that it is unnecessary to bring the holder body into complete intimate contact with the side surface of the object-to-be-measured. That is, this means that it is unnecessary to mount the holder body on the side surface of the object-to-be-measured using a fixing tool such as an adhesive, a mounting screw and a magnet, but it is only necessary that the holder body which is mounted on a pipe placed in the vertical direction does not naturally drop (by its own weight). Therefore, slight clearance may exist between the mounted holder body and the side surface of the object-to-be-measured. This is because the strain gauge is pressed against the side surface of the object-to-be-measured by the feed mechanism, and unless the holder body naturally drops while the gauge pressing member is fed by the feed mechanism, the strain gauge can be pressed against the side surface of the object-to-be-measured. Of course, the holder body may be brought into intimate contact with the side surface of the object-to-be-measured. This is because the mounting operation becomes easier.

Material of the holder body is not especially limited. The holder body is made of metal or a synthetic resin for example. It is more preferable that the holder body be made of a synthetic resin to reduce its weight. Examples of the synthetic resin to be used are an acrylic resin, a nylon resin, a Delrin resin and a PEEK resin (polyether ether ketone resin). A resin having excellent heat resistance such as the PEEK resin is desirable. The strain gauge holder of the present invention includes a mechanism in which the feed mechanism feeds the gauge pressing member to mount the strain gauge. Therefore, it is possible to employ a synthetic resin having relatively small rigidity as compared with metal.

A shape of the opening is designed in accordance with a cross sectional shape of the object-to-be-measured. For example, when the object-to-be-measured has a columnar or cylindrical shape, the opening has a circular shape, and when the object-to-be-measured has a prismatic columnar or prismatic cylindrical shape, the opening has a rectangular shape. Of course, it is unnecessary that a size of the opening and an outer diameter of the object-to-be-measured completely match with each other, and the opening may be slightly larger or smaller than the outer diameter of the object-to-be-measured due to the above-described reason.

A planar shape of the holder body formed in combination with the bracket members is not especially limited, and the planar shape may be a substantially circular shape, a substantially rectangular shape or a substantially hexagonal shape, for example. Therefore, for example, when the holder body is composed of two bracket members, each of the bracket members has a shape obtained by dividing the holder body into two pieces. Furthermore, a dividing position is any position, and the planar shape of the bracket member is a shape obtained by dividing the holder body symmetrically or asymmetrically. For example, when the holder body is divided symmetrically, the planer shape of the bracket member can be a substantially semi-circular shape, a substantially trapezoidal shape or a substantially L-shape.

The bracket member has a thickness that enables the gauge pressing members to be fed in the guide grooves. The thickness of the bracket member is substantially equal to that of the gauge pressing member or may be thicker than that of the gauge pressing member. The bracket member may be thinner than the gauge pressing member or the bracket member may have a thickness that allows the gauge pressing member to protrude from the bracket member.

A structure of a fastening member which couples the bracket members to each other is not limited so long as the fastening members can hold a coupled state of the bracket members, and the fastening members can be screws, bolts and nuts, or draw latches, for example. The draw latch is also called a catch clip or a latch lock. The draw latch is composed of two parts, the one part has a ring-shaped hooking member, and the other part has a receiving member which hooks the hooking member. When the two parts mounted on the side surface of each of the bracket members are fastened to each other, the two bracket members are pulled toward each other. By this action, the holder body is mounted on the side surface of the object-to-be-measured. The draw latch may also have an elastic member such as a spring in some cases. when the two parts are fastened to each other by the draw latches, a restoring force is generated in the elastic member. The fastening member can be such a draw latch. This is because when the fastening member is the draw latch having the elastic member, even if the opening is smaller than the outer diameter of the object-to-be-measured, the bracket members can be mounted on the object-to-be-measured.

The holder body can also be composed of four bracket members, for example. In this case, the holder body has two kinds of large and small bracket members having different shapes. For example, the large bracket member has a T-shape in a planar view, and the small bracket member has a rectangular shape in a planar view. When two large bracket members are coupled to each other while sandwiching two small bracket members, the holder body having a rectangular opening at its central portion is formed.

The holder body can be configured by combined bracket members which are formed from plate-shaped, preferably, thin plate-shaped frame-forming members. The frame-forming member is thin and forms a brink of the guide groove. The holder body can be configured by combined such bracket members. This is because a horizontal cross section (plane) of the bracket member is made small so that the holder body is reduced in size and the holder body can be mounted even in a narrow space.

As described above, the holder body is formed by combined two or more bracket members. Note that a slight gap may exist between the bracket members which form the holder body. Furthermore, when the fastening members such as the draw latches are used, a gap adjusting member such as a plate material is placed, in some cases, between the mating surfaces of the bracket members in order to compensate a coupling force of the fastening member.

The holder body has the guide grooves for guiding the gauge pressing members. The number of guide grooves can be at least one, preferably two, three, or four. When the number of the guide grooves is two or more, the guide grooves are provided such that an angle formed between the guide grooves preferably becomes 90°. This is because strains are synchronously measured at a plurality of points forming 90° on the same plane.

Each of the guide grooves opens toward the side surface of the object-to-be-measured. Furthermore, each of the guide grooves may include a ceiling surface and/or a bottom surface. That is, a portion of the guide groove may be a hole. Furthermore, the guide groove has a width that restrains the gauge pressing member from freely rotating in the guide groove and that enables the gauge pressing member to be fed substantially straight in the guide groove.

Positions of the guide grooves are appropriately determined by the structure of the bracket member and the number of the guide grooves to be needed. For example, in the case of a holder body composed of two bracket members, the two bracket members each having one guide groove are combined. Furthermore, a bracket member having two guide grooves forming an angle of 90° and a bracket member having no guide groove are combined, for example. Furthermore, two bracket members having two guide grooves are combined. Further, in the case of a holder body composed of four bracket members, four bracket members each having one guide groove are combined. Furthermore, two large bracket members each having one guide groove and two small bracket members having no guide groove are combined. Furthermore, a large bracket member having one guide groove, a small bracket member having one guide groove, a large bracket member having no guide groove, and a small bracket member having no guide groove are combined. Then, two bracket members are combined to form a guide groove in some cases.

In this manner, in order to synchronously measure strains at a plurality of points forming 90° on the same plane, one bracket member having one or more guide grooves and the other bracket member having no guide groove are appropriately combined. Furthermore, the angle formed between two guide grooves is not limited to 90°, and this angle can appropriately be determined.

Each of the guide grooves optionally includes the gauge pressing member for mounting the strain gauge on the side surface of the object-to-be-measured, and the feed mechanism for feeding the gauge pressing member. In other words, it is unnecessary that all of the guide grooves include the gauge pressing member and the feed mechanism. This is because it is sufficient that the feed mechanisms and the like are provided only for the guide grooves which are necessary for mounting the strain gauges.

The bracket member has through holes configuring the feed mechanism into which bushings are inserted, on extended lines of the guide groove.

The gauge pressing member is fed in the guide groove and functions to press the strain gauge against the side surface of the object-to-be-measured. The gauge pressing member has a thickness that enables the gauge pressing member to press the strain gauge against the object-to-be-measured under uniform pressing pressure when an axis of the strain gauge is placed in an axial direction of the object-to-be-measured. More specifically, the gauge pressing member has a thickness that enables the pressing surface of the gauge pressing member to press the entire foil strain gauge when the foil strain gauge is mounted. Furthermore, when the frictional strain gauge is mounted, it is only necessary that the pressing surface of the gauge pressing member presses a portion of the frictional strain gauge, and the thickness of the gauge pressing member is equal to or less than the length in the axial direction of the strain gauge.

The pressing surface (surface facing the object-to-be-measured) of the gauge pressing member includes a buffer material composed of an elastic body such as silicone rubber for mounting the foil strain gauge. Preferably, the buffer material is fixed to the pressing surface of the gauge pressing member by an adhesive. The foil strain gauge is sandwiched between the buffer material and the object-to-be-measured. A thickness of the buffer material is appropriately adjusted in accordance with Young's modulus of the elastic body and a depth of a later-described recess. Furthermore, the buffer material is preferably a transparent or translucent elastic body. This is because it is possible to press the foil strain gauge while visually checking a state thereof such as its orientation and position. When the gauge holder is installed, the foil strain gauge is placed between the buffer material and the object-to-be-measured in some cases, or the gauge holder is mounted after the foil strain gauge is fixed in advance to the buffer material by an adhesive or the like in some cases.

The gauge pressing member has a recess in which the buffer material is placed on the pressing surface thereof in some cases. The recess preferably has extra spaces. The extra spaces are provided in a lateral direction (direction intersecting with a compression direction) of the recess when the gauge holder is viewed from the plane. The extra spaces are spaces in which the buffer material deforms by the same thickness as the depth of the recess (compression direction of the buffer material) when the buffer material is pressed against the side surface of the object-to-be-measured, that is, the extra spaces are spaces into which the compressed and deformed buffer material moves. When a tip end of the gauge pressing member abuts against the side surface of the object-to-be-measured, the buffer material is compressed and deformed, and its depth becomes the same as a depth of the recess. As a result, the strain gauges placed at a plurality of locations are pressed under the same pressure, and the foil strain gauges are mounted under constant pressure irrespective of operators. That is, on the assumption that a thickness of the buffer material is d and a depth of the recess is kd ($0<k<1$), when the tip end of the gauge pressing member abuts against the side surface of the object-to-be-measured by the feed mechanism, a thickness of the buffer material becomes kd ($0<k<1$). At this time, when Young's modulus of the elastic body is E (KPa), pressure at which the strain gauge is pressed theoretically becomes $E \times (1-k)$ (KPa). In this manner, when the gauge pressing member is fed by the feed mechanism until the tip end of the gauge pressing member abuts, the strain gauge is pressed against the object-to-be-measured always under the same pressure.

When the extra spaces provided, it is preferable that the depth of the recess be deeper than that of the extra spaces. This is because the edges made by the difference in depth between the recess and the extra spaces make it easy to place the buffer material on the gauge pressing member. Of course, the depth of the recess and the depth of the extra spaces may be the same. That is, the difference in level at the boundary between the recess and the extra spaces may be eliminated, and bottom surfaces of both the recess and the extra spaces may be equalized in level. Furthermore, the extra spaces are optional, and the gauge pressing member may only have a recess in which the buffer material is placed. Further, the recess is also optional, and the gauge pressing member may have the buffer material on the planer pressing surface of the gauge pressing member.

Instead of making the pressing forces of the strain gauges constant by the recess and the extra space, it is also possible to adjust a length of the feed screw of the feed mechanism, and to press the strain gauge against the side surface of the object-to-be-measured under constant pressure. In this case, a gauge pressing member including a buffer material having a constant thickness in the recess or a gauge pressing member including a buffer material on the pressing surface having no recess is used.

When the gauge pressing member does not have the recess in its pressing surface, i.e., when the pressing surface is flat, the guide groove preferably includes extra spaces in its both sides area. The extra spaces are provided at positions close to the object-to-be-measured. The extra spaces are formed by widening a groove width of the guide groove. The extra spaces have a size that enables the buffer material to be compressed and deformed without abutting against the bracket member when the buffer material is pressed against the side surface of the object-to-be-measured. In this case, in order to make pressing forces of the strain gauges constant, a mark showing a pressing position of the gauge pressing member is provided on a surface of the bracket member.

In order to mount the frictional strain gauge, a recess for mounting the strain gauge is provided in the gauge pressing member. A depth of this recess is shallower than a thickness of the frictional strain gauge. When the frictional strain gauge is mounted, the strain gauge is placed between the gauge pressing member and the object-to-be-measured without through the buffer material.

The gauge pressing member is made of metal such as aluminum, copper, iron, aluminum alloy and stainless alloy to secure heat resistance and rigidity. Aluminum alloy is preferable in terms of weight reduction. In order to achieve further weight reduction, it is also possible to employ a synthetic resin having the same material as that of the brackets.

The feed mechanism is a mechanism for feeding the gauge pressing member in the guide groove from outside of the holder body. The feed mechanism includes the feed screw and a bushing. The bushing has a cylindrical portion and a flange. An inner surface of the cylindrical portion has a thread. The flange is provided on a tip end of the cylindrical portion. The bushing is inserted into a through hole provided in the bracket member from the side of the guide groove. The insertion of the bushing is restricted by existence of the flange. The feed screw is threadedly inserted into the bushing from outside of the bracket member. A back surface (surface opposite to the pressing surface of the strain gauge) of the gauge pressing member has a threaded hole, and the gauge pressing member has a function as a nut of the feed screw.

When the feed screw is rotated in the loosening direction (counterclockwise direction), the gauge pressing member of which rotation is restricted by the guide groove is fed in the guide groove toward the object-to-be-measured, and presses the strain gauge against the side surface of the object-to-be-measured. In this manner, the feed mechanism gives a pressing force to the gauge pressing member. Furthermore, when the feed screw is rotated in the fastening direction (clockwise direction), the gauge pressing member is fed in the guide groove in the opposite direction and the given pressing force is decreased.

The feed mechanism has a nut which threadedly engages with the feed screw in some cases. The nut is provided between the bushing and the gauge pressing member. This nut avoids a case where the bushing is loosened in the through hole, i.e., avoids a case where only the feed screw rotates and the bushing does not rotate, and the gauge pressing member is smoothly fed.

The strain gauge holder of the present invention has a structure in which the gauge pressing members are fed in the guide grooves that the holder body has and presses the strain gauges. Therefore, the configuration is relatively simple, and the weight of the holder body can be reduced. Furthermore, since the gauge holder can be mounted on the pipe from a side surface direction of the pipe, the mounting operation is easy. Then, since the strain gauges are sandwiched between the gauge pressing members and the object-to-be-measured through the buffer material or without through the buffer material, it is possible to use commercially available foil strain gauges without using a dedicated mounting member.

Further, a thickness of the strain gauge holder of the present invention is suppressed to substantially the same thickness as a length in the vertical direction of the strain gauge. That is, since it is only necessary that the gauge holder has a thickness that allows the gauge pressing member to be fed in the guide groove, a requisite minimum thickness of the gauge holder is equal to the thickness of the gauge pressing member. Therefore, in the case of the gauge holder for mounting the foil strain gauge, it is necessary that the pressing surface of the gauge pressing member can press the entire surface of the foil strain gauge. Therefore, a requisite minimum thickness of the gauge holder is slightly longer than a length in the vertical direction of the foil strain gauge. Furthermore, in the case of the gauge holder for mounting the frictional strain gauge, a thickness of the pressing surface of the gauge pressing member may be shorter than the frictional strain gauge. Therefore, a requisite minimum thickness of the gauge holder is suppressed to the same thickness as or a thickness slightly shorter than a length in the vertical direction of the frictional strain gauge. As described above, regions where strains cannot be measured almost do not exist at upper and lower locations of the strain gauge holder, and it becomes possible to measure strains also in the vicinity of a pipe-connected portion and a bent angle of the pipe.

In addition, the one or more guide grooves are provided on the same plane. Therefore, although the gauge holder has the simple configuration, it is possible to synchronously measure strains such as bending, compression, tension and twist at a plurality of points forming 90° on the same plane.

The present invention will be described in more detail based on the following embodiments. Of course, the embodiments are exemplifications, and needless to say, the present invention is not limited to the embodiments.

Embodiment 1

Figure 2:
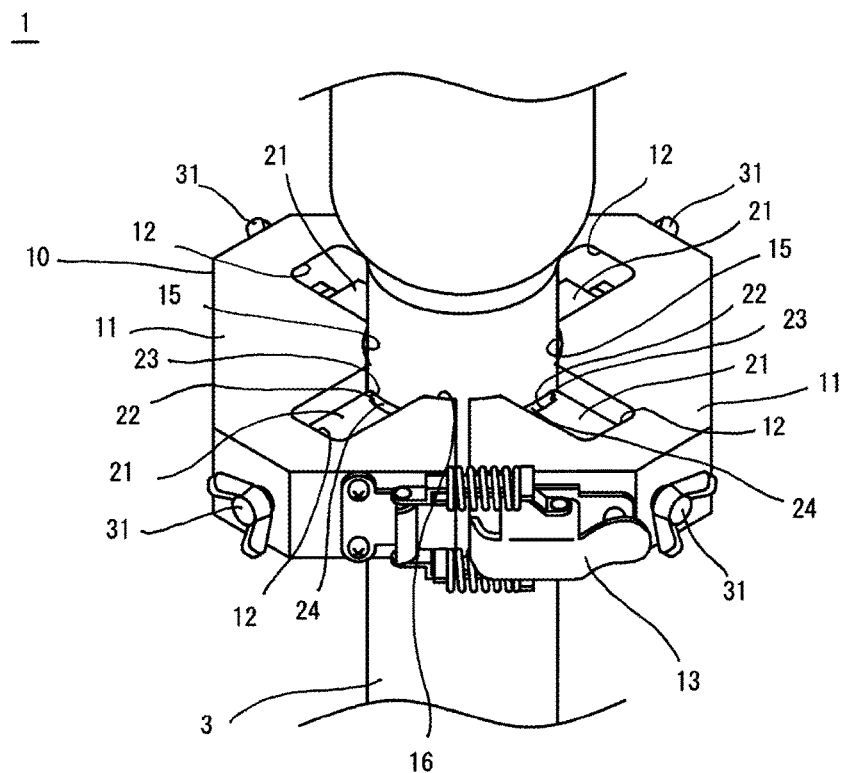
FIG. 2 is an explanatory diagram showing a state where the strain gauge holder is mounted on a pipe.
Figure 3:
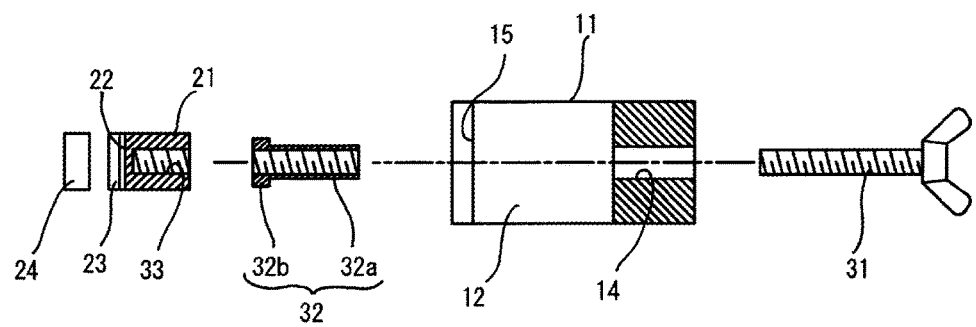
FIG. 3 is an explanatory sectional view of a feed mechanism in the strain gauge holder.

FIG. 1 is an exploded perspective view of a gauge holder for mounting a foil strain gauge of an embodiment of the present invention, FIG. 2 is an explanatory diagram showing a state where the gauge holder is mounted on a pipe, and FIG. 3 is an explanatory sectional view of a feed mechanism of the gauge holder. This gauge holder 1 is for a foil strain gauge. A holder body 10 has two bracket members 11 made of a PEEK resin. The two bracket members 11 have the same size, and a planar shape of each of the bracket members 11 is substantially trapezoidal. A central portion of a mating surface of each of the bracket members 11 has a semi-circular curved surface 15 in a planer view. When the two bracket members 11 are coupled to each other, the holder body 10 having a substantially circular opening 16 at the substantially central portion is formed. The bracket member 11 has a thickness which is substantially the same as a length in the vertical direction of a foil strain gauge 2.

Each of the two bracket members 11 has draw latches 13 which are two sets of fastening members at its side surface. The draw latche 13 shown in the drawings is composed of a part 13a including a ring member and a spring, and a hook-shaped part 13b which engages with the ring member.

Each of the bracket members 11 has two guide grooves 12 at an angle of 90°. One end of each of the guide grooves 12 opens toward a side surface of a pipe 3. When the two bracket members 11 are coupled to each other, the holder body 10 having four guide grooves 12 at an angle of 90° is formed. Furthermore, an angle portion is chamfered at which a side surface configuring a guide groove 12 of the bracket member 11 and a surface facing a side surface of the pipe 3 intersect each other. Hence, it is easy to adjust a position in the circumferential direction of the bracket member 11 without damaging strain gauges by the bracket member 11. Through holes 14 into which bushings 32 are inserted are provided on an extended lines of the guide grooves 12 of the bracket member 11.

Each of the guide grooves 12 is provided with a gauge pressing member 21 having a function of a feed nut. The gauge pressing member 21 is made of aluminum alloy and formed in a rectangular parallelepiped shape. The gauge pressing member 21 has a recess 22 in a pressing surface of the strain gauge 2. An angle portion is chamfered at which a side surface of the gauge pressing member 21 which is opposed to the guide groove 12 and a pressing surface of that side surface intersect each other. Furthermore, the gauge pressing member 21 has a threaded hole 33, into which a feed screw 31 is threadedly inserted, on its back surface (surface opposite to the pressing surface).

Figure 4A:
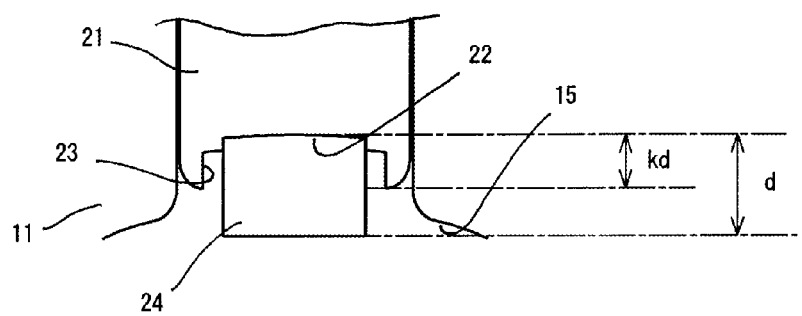
FIGS. 4(a) and 4(b) are explanatory diagrams showing action of a buffer material.
Figure 4B:
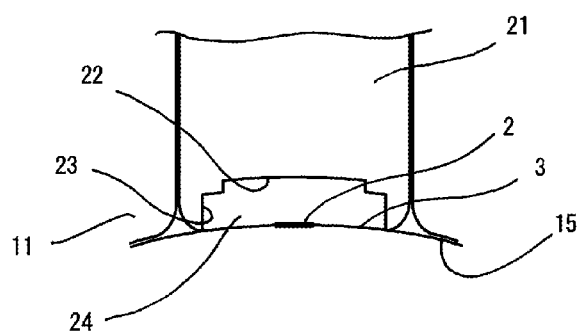

The gauge pressing member 21 has extra spaces (cut-out) 23 in a lateral direction of the recess 22 (direction in which the buffer material 24 spreads). Furthermore, as shown in FIG. 4(a), a depth kd (0<k<1) of the recess 22 is deeper than that of the extra spaces 23. As a result, a difference in level is generated at a boundary between a bottom surface (depth surface) of the recess 22 and a bottom surface (depth surface) of the extra spaces 23. The buffer material 24 (Young's modulus E (KPa)) made of translucent silicon rubber and having a thickness d is provided in the recess 22. As shown in FIG. 4(b), the extra spaces 23 have such a size that accommodates the buffer material 24 placed in the recess 22 when the gauge pressing member 21 is pressed against the side surface of the pipe 3.

As shown in FIG. 3, the feed mechanism includes a wing screw as the feed screw 31 and the bushing 32. The bushing 32 has a cylindrical portion 32a having a thread formed on the inner surface, and a flange 32b provided on a tip end of the cylindrical portion 32a. The bushing 32 is inserted into the through hole 14 of the bracket member 11 from the guide groove 12, and is threadedly engaged with the feed screw 31 which is inserted from outside of the bracket member 11. The feed screw 31 has a length sufficient for enabling the feed screw 31 to press the strain gauge 2 against the side surface of the pipe 3, and a tip end of the feed screw 31 protruding from the bushing 32 is threadedly inserted into the threaded hole 33 formed in a back surface of the gauge pressing member 21.

As shown in FIG. 2, the gauge holder 1 is mounted on the side surface of the pipe 3 by coupling the two sets of draw latches 13 to each other. Although the holder body 10 is loosely mounted on the side surface of the pipe 3 which is placed in the vertical direction, the gauge holder 1 does not drop naturally. This is because the holder body 10 is substantially pressed against the side surface of the pipe 3 by fastening the feed screw 31.

Since the gauge holder 1 of the present invention only has a thickness which is substantially the same as a length in the vertical direction of the foil strain gauge 2, the gauge holder 1 can be mounted, without difficulty, in the vicinity of a pipe-connected portion where a diameter of the pipe 3 increased in many cases as shown in FIG. 2. Furthermore, since the gauge holder 1 is mounted on the pipe 3 by coupling the two bracket members 11 to each other at the side surfaces of the bracket members 11, the mounting operation is also easy.

Furthermore, the extra spaces 23 are provided in the pressing surface of the gauge pressing member 21. Therefore, when the gauge pressing member 21 is pressed against the side surface of the pipe 3, the foil strain gauge 2 is pressed against the side surface of the pipe 3 under pressing pressure of $E \times (1-k)$ (KPa).

Embodiment 2

Figure 5:
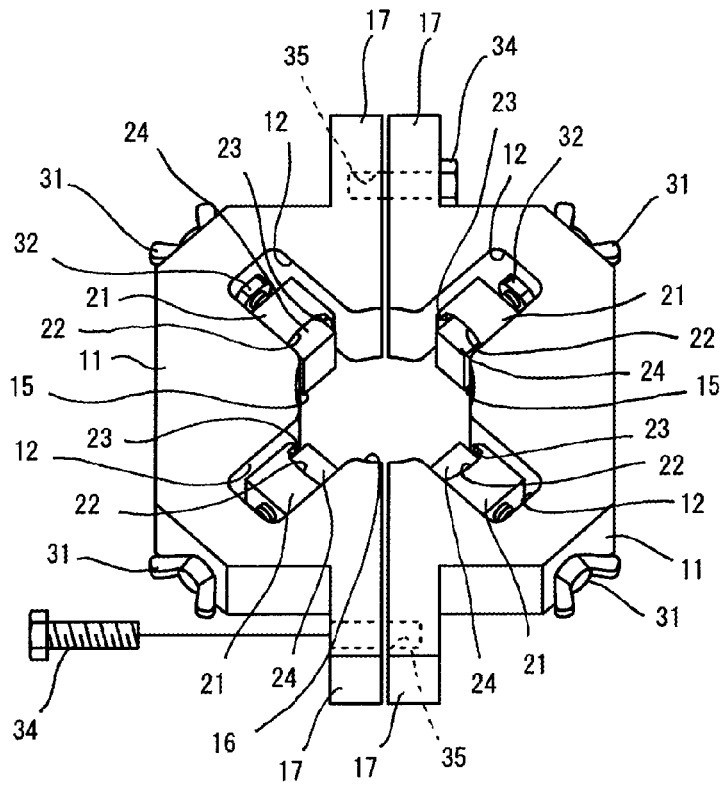
FIG. 5 is a perspective view of a strain gauge holder of another embodiment.
Figure 6:
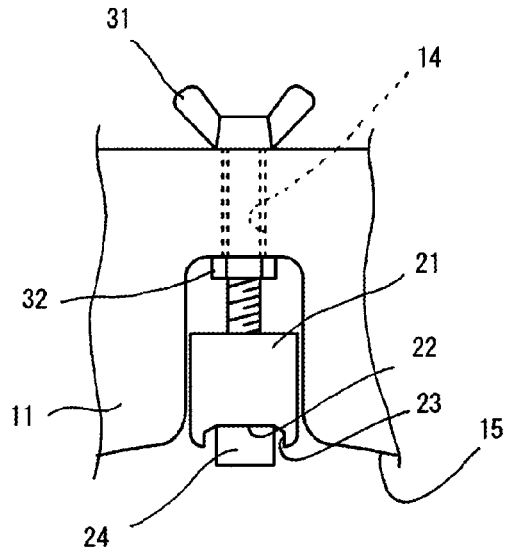
FIG. 6 is an enlarged plan view of a portion of the strain gauge holder in FIG. 5.

FIG. 5 is a perspective view of a gauge holder 1 of another embodiment of the present invention, and FIG. 6 is a partially omitted plan view of the gauge holder 1. This gauge holder 1 is different from the gauge holder 1 of Embodiment 1 in that two bracket members 11 in the gauge holder 1 include a pair of coupling portions 17 for coupling the two bracket members 11 to each other. One coupling portion 17 has a threaded hole 35, and the two bracket members 11 are coupled to each other through a fixing screw 34. In this manner, it is also possible to mount the gauge holder 1 on a side surface of a pipe 3 by a fastening member which is composed of the fixing screw 34.

In this gauge holder 1, a difference in level does not exist at a boundary between a bottom surface (depth surface) of extra spaces 23 and a bottom surface (depth surface) of a recess 22 in which a buffer material is placed, and the bottom surface of the extra spaces 23 are inclined surfaces. Hence, the extra spaces 23 easily accommodates the spread of a buffer material 24, and the compressed buffer material 24 easily comes into intimate contact with the side surface of the pipe 3. It is also easy to machine the extra spaces 23 and the recess 22.

Embodiment 3

Figure 7A:
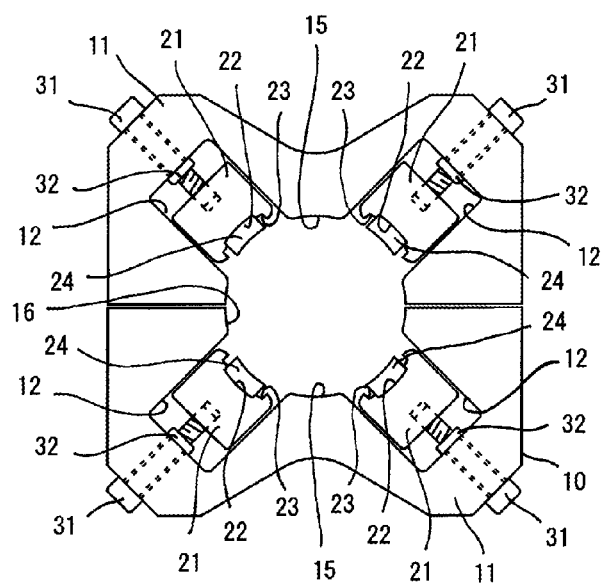
FIGS. 7(a) to 7(c) are explanatory diagrams of a strain gauge holder of another embodiment.
Figure 7C:
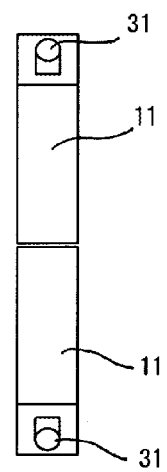
Figure 7B:
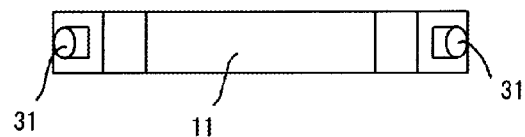

FIG. 7(a) is a plan view of a gauge holder 1 of another embodiment, FIG. 7(b) is a front view thereof and FIG. 7(c) is a right side view thereof. In this gauge holder 1, a cap bolts are used instead of the wing screws as feed screws in Embodiment 1. The cap bolt is made of aluminum alloy, and the weight thereof can be reduced as compared to the gauge holder 1 of Embodiment 1. In this manner, the cap bolt can also be used for a feed mechanism. Note that, in FIG. 7, the draw latches which are the fastening members are omitted.

Embodiment 4

Figure 8:
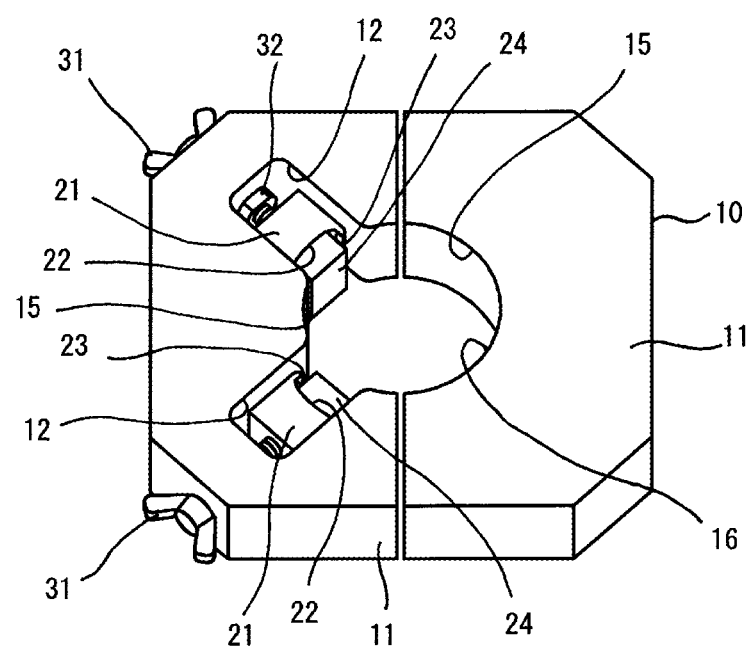
FIG. 8 is a perspective view of a strain gauge holder of another embodiment.

FIG. 8 is a perspective view of a gauge holder 1 of another embodiment. A holder body 10 of Embodiment 4 is different from the holder body 10 of Embodiment 1 in that one bracket member 11 has two guide grooves 12 and the other bracket member 11 does not have any guide grooves 12. Note that, in FIG. 8, draw latches which are fastening members are not illustrated. In this gauge holder 1 also, the two guide grooves 12 are provided in the bracket member 11 at an angle of 90°. Therefore, although a structure of the gauge holder is simple, it is possible to synchronously measure strains at two points forming 90° on the same plane.

Embodiment 5

Figure 9:
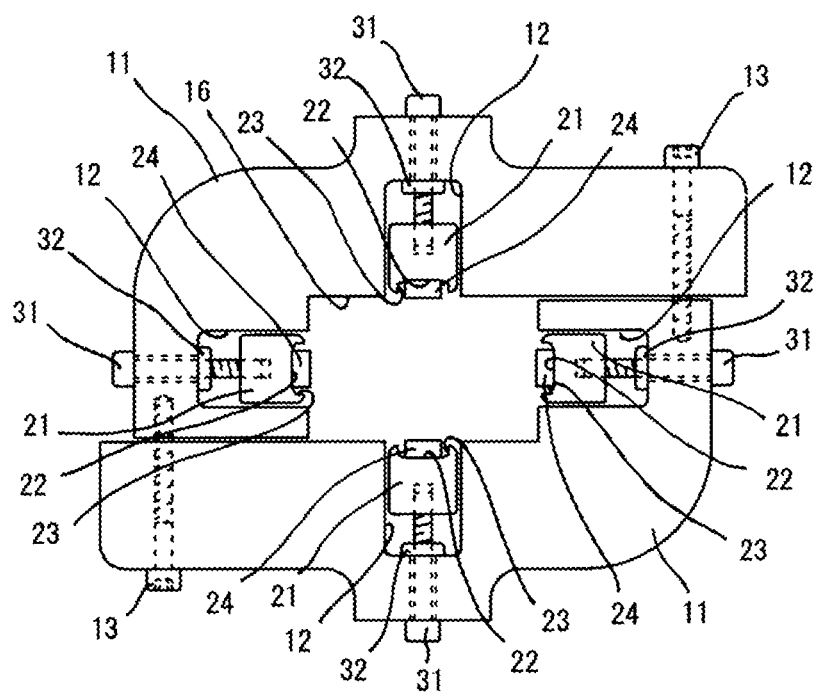
FIG. 9 is a plan view of a strain gauge holder of another embodiment.

FIG. 9 is a plan view of a gauge holder 1 of another embodiment. A holder body 10 has two bracket members 11, and a planar shape of each of the bracket members 11 is a substantially L-shape. When the two bracket members 11 are coupled to each other through fixing screws 13 which are fastening members, the holder body 10 having a rectangular opening 16 surrounded by the two bracket members 11 is formed.

Each of the bracket members 11 has two guide grooves 12. One guide groove 12 is provided on one of two sides forming an L-shape, the other guide groove 12 is provided on remaining one side, and the two guide grooves 12 are provided at an angle of 90°. One end of each of the guide grooves 12 opens toward a side surface of a rectangular pipe 3.

Since this gauge holder 1 has the rectangular opening 16 formed by coupling the bracket members 11 to each other, strain gauges 2 are mounted on an object-to-be-measured having a rectangular cross section.

Embodiment 6

Figure 10:
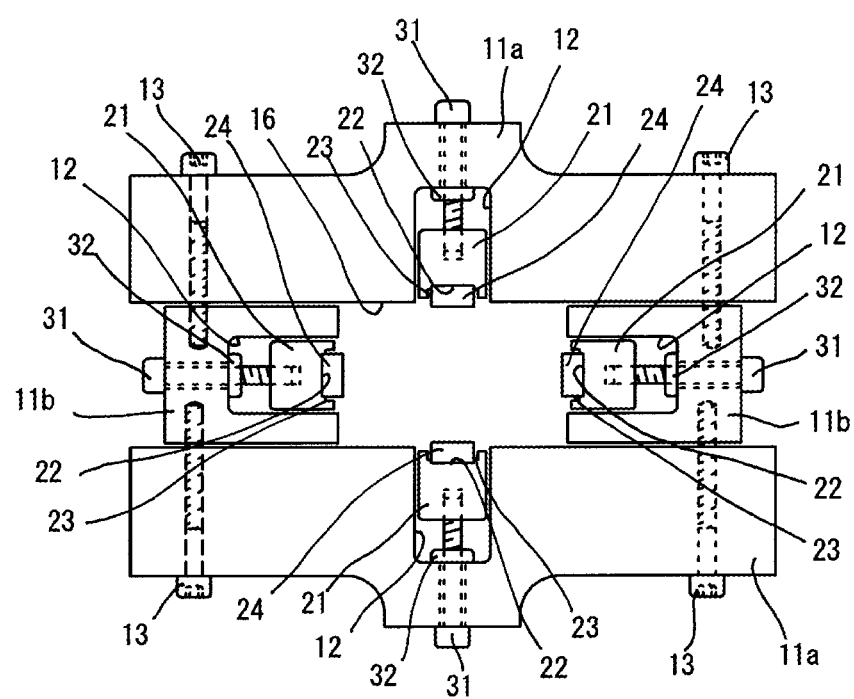
FIG. 10 is a plan view of a strain gauge holder of another embodiment.

FIG. 10 is a plan view of a gauge holder 1 of another embodiment. A holder body 10 has four bracket members 11a and 11b. The two large bracket members 11a have the same shape and same size, and a planar shape of each large bracket member is a substantially T-shape. The remaining two small bracket members 11b also have the same shape and same size, and a planar shape of each small bracket member is a substantially rectangular shape. When the two large bracket members 11a are coupled to each other through bolts 13 while sandwiching the two small bracket members 11d therebetween, the holder body 10 having a rectangular opening 16 surrounded by the four bracket members 11a and 11b is formed. The four bracket members 11a and 11b respectively include guide grooves 12, and one end of each of the guide grooves 12 opens toward a side surface of a rectangular pipe (not shown). It is also possible to configure the holder body 10 by combining the four bracket members 11 in this manner.

Embodiment 7

Figure 11A:
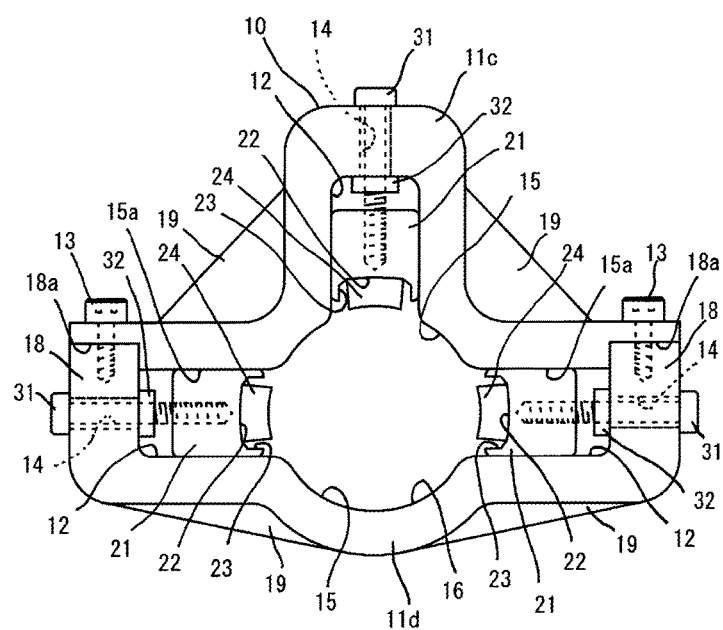
FIGS. 11(a) to 11(c) are explanatory diagrams of a strain gauge holder of another embodiment.
Figure 11C:
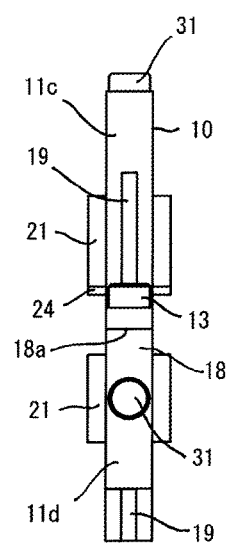
Figure 11B:
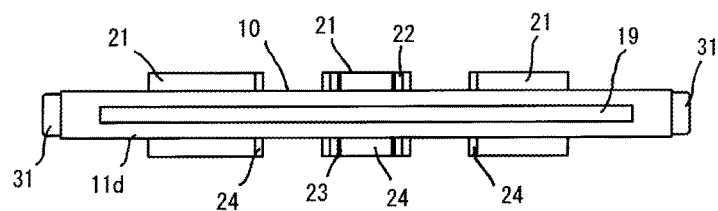

FIG. 11(a) is a plan view of a gauge holder 1 of another embodiment, FIG. 11(b) is a front view thereof and FIG. 11(c) is a side view thereof. A holder body 10 includes two bracket members 11c and 11d. Each of the bracket members 11c and 11d is formed of a thin plate-shaped frame-forming member. The frame-forming member is a member having a small width in a planar view. One bracket member 11c has one guide groove 12. The frame-forming member forming this bracket member 11c is bent to form brinks of the guide grooves 12. Further, the bracket member 11c has a curved surfaces 15 forming openings 16 on left and right sides of the guide groove 12. Both tip ends of the curved surfaces 15 have mating portions 15a which are flat surfaces extending outward. Then, the ends of the mating portion 15a which are the flat surfaces include cut-outs 18a with which projections 18 of the other bracket member 11d fits.

The other bracket member 11d is also formed of a thin plate-shaped frame-forming member. This frame-forming member is also a member having a small width in a planar view, and a central portion of a mating surface of the frame-forming member has a curved surface 15 which swells outside. Furthermore, the bracket member 11d does not have any guide grooves. The bracket member 11d has projections 18 on both sides of this curved surface 15. The projections 18 are parts of L-shaped part in the bracket member 11d in a planar view, and the projections 18 are mated with the flat mating portions 15a of the other bracket member 11c to form guide grooves 12. Each of the projections 18 has a through hole 14 into which the bushing 32 is inserted.

When the cut-outs 18a of the bracket member 11c and the projections 18 of the bracket member 11d fit each other and the two bracket members 11c and 11d are coupled to each other through fixing screws 13, the holder body 10 is formed of the curved surface 15 of the bracket member 11c and the curved surface 15 of the bracket member 11d. A substantially circular opening 16 is formed in the holder body 10, and a pipe 3 is placed in a central portion of the opening 16. Furthermore, the guide grooves 12 are formed by the bracket member 11c and inner side surfaces of the bracket member 11d. In this manner, the three guide grooves 12 are formed in the holder body 10 by a combination of the two bracket members 11c and 11d.

The bracket member 11c has thin plate-shaped ribs 19 at corners formed by an outer side surface at a location where the frame-forming member forms the guide grooves 12 and by an outer side surface of the frame-forming member at a location where the mating portions 15a are formed (location where the curved surface 15 is formed). Furthermore, the bracket member 11d has thin plate-shaped ribs 19 at corners formed by an outer side surface at a location where the curved surface 15 is formed and by outer surfaces of the projections 18. These ribs 19 enhance the strength of the holder body 10. These ribs 19 are not always necessary, and are provided as needed.

A thickness of the holder body 10 is thinner than that of the gauge pressing member 21, and the holder body 10 is made from the plate-shaped frame-forming member. Therefore, the gauge holder is small as a whole. Hence, the weight of the gauge holder of Embodiment 7 can be reduced as a whole, as compared to the gauge holder 1 of Embodiment 1. Furthermore, although the bracket member 11d has the projections 18, the bracket member 11d is not different from a bracket member which is made from substantially one columnar member as a whole. Hence, even if an obstacle such as a wall exists behind the pipe 3 to be mounted and a space behind the pipe 3 is narrow, the bracket member 11d can be placed behind the pipe 3. As a result, it is possible to mount the strain gauge extremely easily.

Embodiment 8

Figure 12:
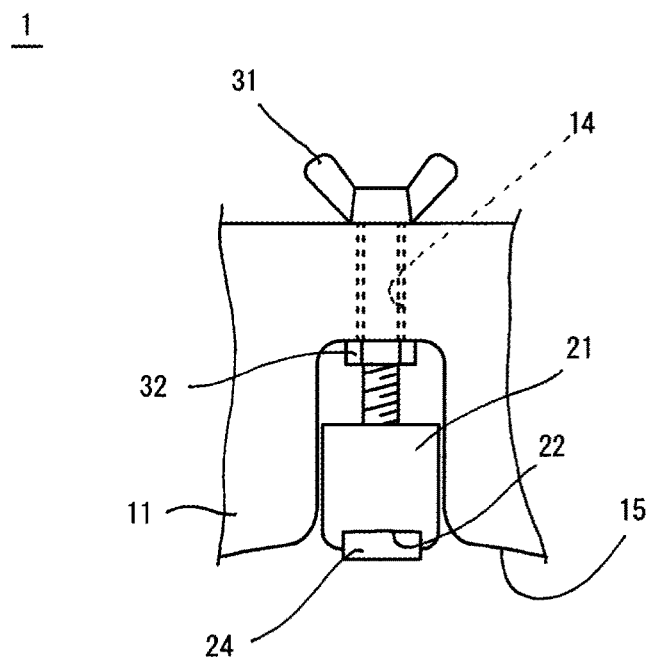
FIG. 12 is a partially omitted plan view of a strain gauge holder of another embodiment.

FIG. 12 is a partially omitted plan view of a gauge holder 1 of another embodiment. A gauge pressing member 21 of the gauge holder 1 includes a recess 22 but does not include any extra spaces 23. A buffer material 24 is placed in the recess 22, and the buffer material 24 presses a strain gauge (foil strain gauge) 2 against a side surface of a pipe 3. It is also possible to use the gauge pressing member 21 having no extra spaces 23.

Embodiment 9

Figure 13:
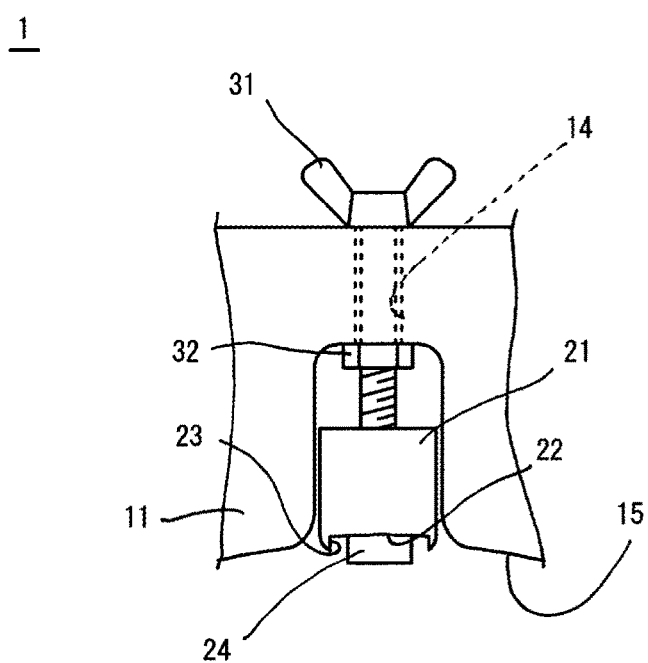
FIG. 13 is a partially omitted plan view of a strain gauge holder of another embodiment.

FIG. 13 is a partially omitted plan view of a gauge holder 1 of another embodiment. A bottom surface (depth surface) of a recess 22 in a gauge pressing member 21 of this gauge holder 1 and a bottom surface (depth surface) of extra spaces 23 are the same planes, and there is no difference in level at a boundary between the bottom surfaces. That is, the gauge pressing member 21 has a structure as if a buffer material 24 were placed in the recess having a width wider than that of the buffer material 24. It is also possible to employ the gauge pressing member 21 having such a simple structure.

Embodiment 10

Figure 14:
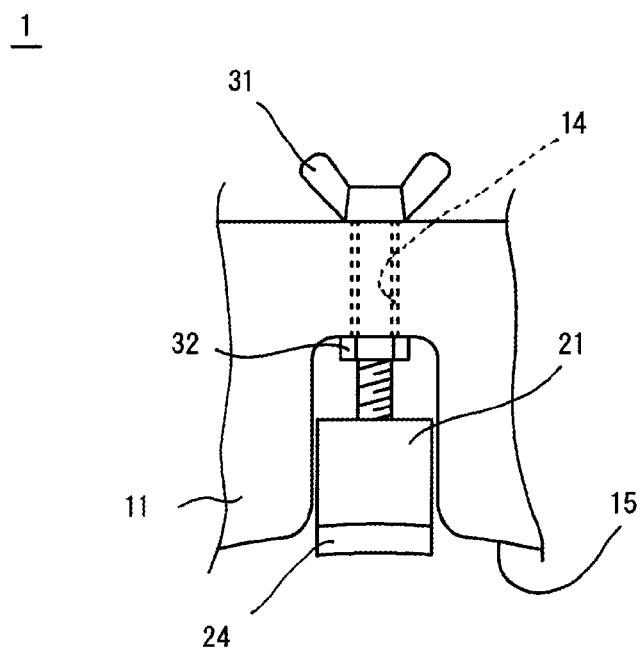
FIG. 14 is a partially omitted plan view of a strain gauge holder of another embodiment.

FIG. 14 is a partially omitted plan view of a gauge holder 1 of another embodiment. A gauge pressing member 21 of this gauge holder 1 does not have a recess 22 and any extra spaces 23, and a buffer material 24 is directly provided on a pressing surface which is a flat surface. Furthermore, the pressing surface of the buffer material 24 has a curvature which is substantially equal to that of a side surface of a pipe which is an object-to-be-measured. It is also possible to employ the gauge pressing member 21 having such a simple structure.

Embodiment 11

Figure 15:
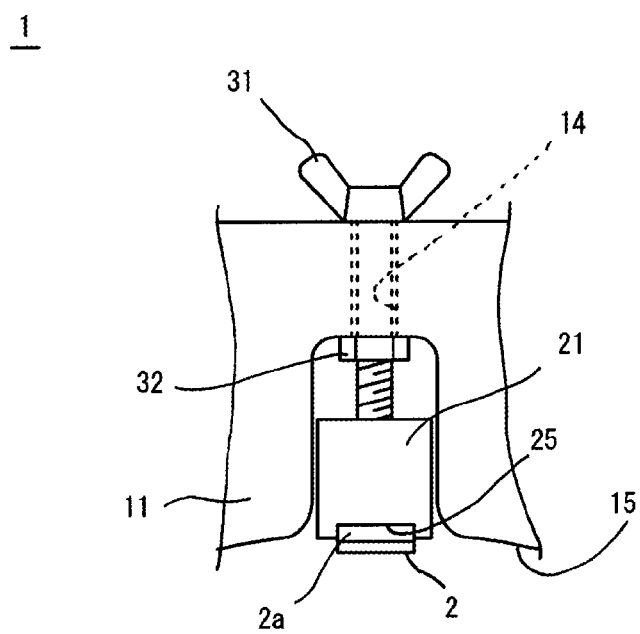
FIG. 15 is a partially omitted plan view of a strain gauge holder of another embodiment.

FIG. 15 is a partially omitted plan view of a gauge holder 1 of another embodiment. A gauge pressing member 21 of this gauge holder 1 is for mounting a frictional strain gauge. A pressing surface of the gauge pressing member 21 includes a recess 25 in which a strain gauge 2 is placed. A depth of the recess 25 is substantially the same as a thickness of a rigid substrate 2a of a frictional strain gauge 2. A thickness of the gauge pressing member 21 is substantially equal to the length in the axial direction of the frictional strain gauge 2. When the gauge pressing member 21 having such a recess 25 is used, the strain gauge holder 1 which is also suitable for the frictional strain gauge 2 is provided.

Embodiment 12

Figure 16:
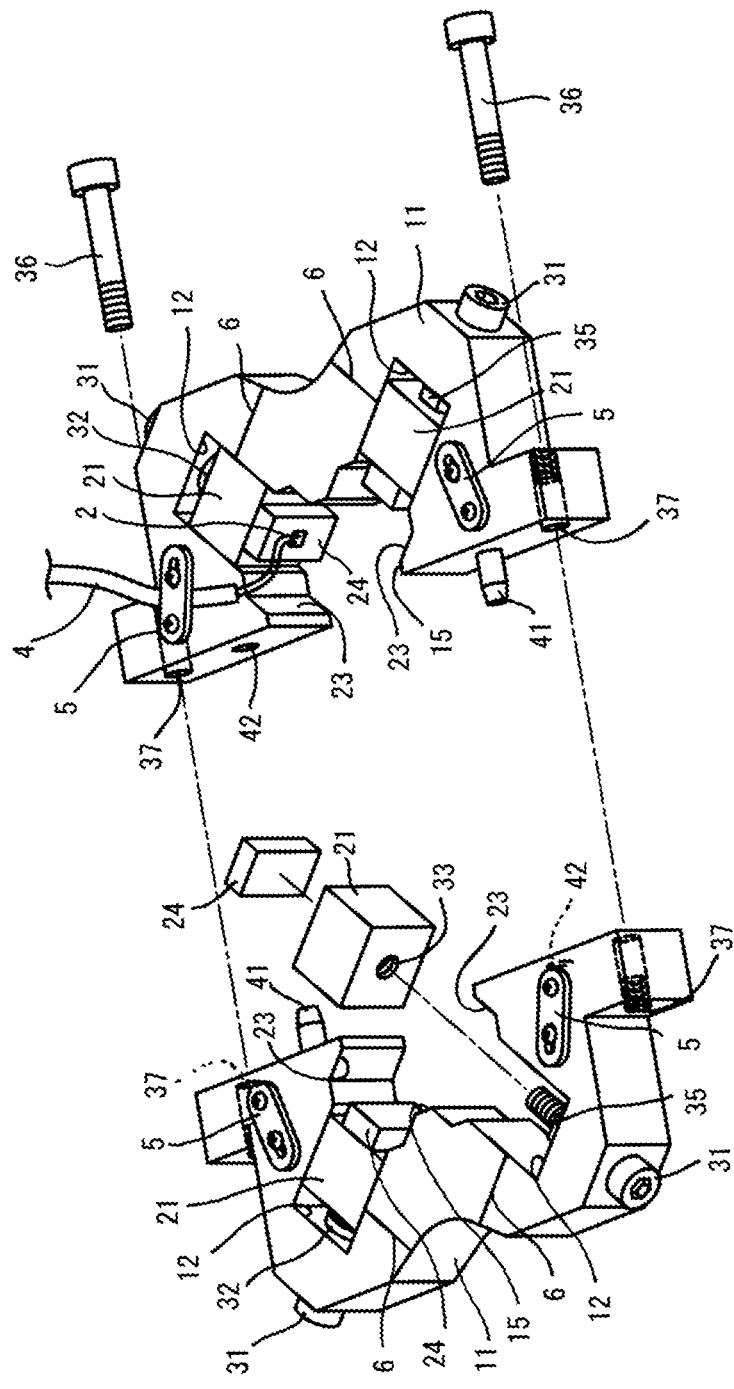
FIG. 16 is an exploded perspective view of a strain gauge holder of another embodiment of the present invention.
Figure 17:
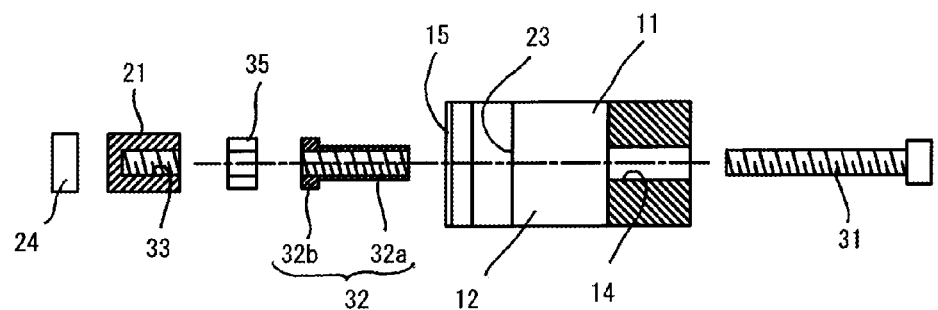
FIG. 17 is an explanatory sectional view of a feed mechanism in the strain gauge holder.
Figure 18:
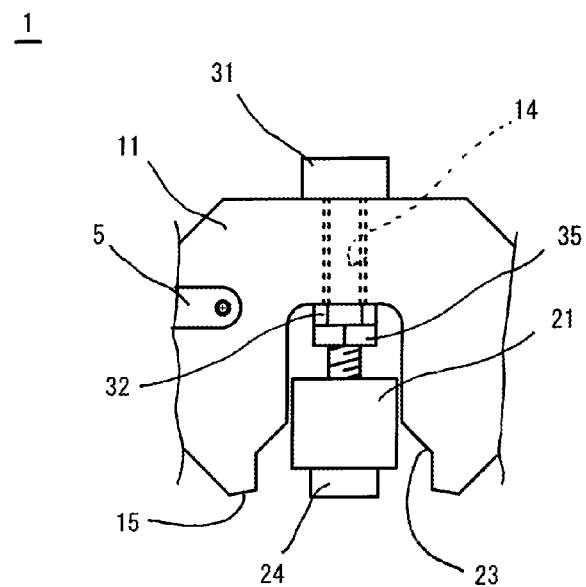
FIG. 18 is a partially omitted plan view of the strain gauge holder.

FIG. 16 is an exploded perspective view of a gauge holder 1 of another embodiment. This gauge holder 1 is mounted on a pipe 3 by two sets of fastening members composed of cover bolts 36 and threaded holes 37 provided in the bracket members 11. A configuration of a feed mechanism in this gauge holder 1 is substantially the same as that of the gauge holder 1 of Embodiment 1, but is different therefrom in the following points. Firstly, extra spaces (wide portion of a guide groove 12) 23 are provided in guide grooves 12 as shown in FIG. 18. Each of the extra spaces 23 is formed by laterally increasing a groove width of the guide groove 12 at a position close to the pipe 3. The extra spaces 23 have a size that allows a buffer material 24 not to come into contact with the bracket member 11 when the buffer material 24 is compressed and deformed. Secondly, a pressing surface of the gauge pressing member 21 is a flat vertical surface, and the buffer material 24 is fixed to the pressing surface by an adhesive. Thirdly, the feed mechanism includes locking nuts 35 for suppressing rotation of bushings 32 as shown in FIG. 17.

In this gauge holder 1, the extra spaces 23 are provided in the guide grooves 12 instead of the gauge pressing members 21. When the extra spaces 23 are provided in the gauge pressing member 21, a relation between a depth of the recess 22 in which the buffer material 24 is provided, a thickness of the buffer material 24 and Young's modulus of the buffer material 24 must be taken into account in order to obtain a constant pressing force. On the other hand, when the extra spaces 23 are provided in the guide groove 12, since it is unnecessary to take the depth of the recess 22 into account, it becomes easy to select material of the buffer material 24. In this case, in order to keep forces of the gauge pressing members 21 for pressing a foil strain gauges 2 against the pipe 3 constant, marks 6 showing feeding positions of the gauge pressing members 21 are provided on upper surfaces of the bracket members 11. These marks 6 are linear marks as shown in the drawing, and may be triangular marks. That is, in this gauge holder 1, it is possible to press the foil strain gauges 2 against the pipe 3 by a constant pressing force by feeding the pressing surface of the gauge pressing member 21 to the mark 6. Furthermore, the foil strain gauges 2 are fixed to the buffer material 24 by an adhesive. Hence, the foil strain gauges 2 are easily attached.

The threaded holes 37 configuring the fastening member are partially threaded and engaged with cover bolts 36 on its portion. When the two bracket members 11 are coupled to each other, the cover bolts 36 are threadedly engaged in advance with the threaded holes 37 of one bracket member 11. Then, after the two bracket members 11 are applied to the pipe 3, the cover bolts 36 are threadedly inserted into the threaded holes 37 of the other bracket member 11. If the fastening member composed of the cover bolts 36 and the two threaded holes 37 are used, since the two bracket members 11 are coupled to each other in a state where they are threadedly engaged with the threaded holes 37 of the bracket member 11, there is no fear that the cover bolts 36 drop when the holder body 10 is attached.

Furthermore, each of the bracket members 11 includes holding tools 5 for fixing leads 4 of the foil strain gauge 2. Then, the two bracket members 11 each include a pair of insertion pins 41 and a pair of holes 42 into which the insertion pins 41 are inserted. The pair of insertion pins 41 and the pair of the holes 42 into the insertion pins 41 are inserted facilitate the attachment of the gauge holder 1 to the pipe 3.

Note that, although only one foil strain gauge 2 is illustrated in FIG. 17, the necessary number of foil strain gauges 2 is provided as described above. Furthermore, the number of the guide grooves 12, the number of the feed mechanisms configured in the guide grooves 12, and the number of the holding tools 5 of the leads 4 are appropriately determined. The gauge holders 1 shown in Embodiments 1 to 11 each also include the locking nuts 35 of the bushing 32, and the holding tools 5 of the leads 4 in some cases.

INDUSTRIAL APPLICABILITY

According to the present invention, a lightweight strain gauge holder having a simple configuration is provided. In addition, there is provided a gauge holder capable of synchronously measuring strains at a plurality of points forming 90° on the same plane.

DESCRIPTION OF REFERENCE SIGNS 2 strain gauge
3 pipe or rectangular pipe which is object-to-be-measured
5 holding tool of lead
11 bracket member
12 guide groove
21 gauge pressing member
22 recess
23 extra space
24 buffer material
31 feed screw
32 bushing

The invention claimed is:

1. A strain gauge holder comprising:
a holder body configured to be mounted on a side surface of a cylindrical object-to-be-measured;
one or more gauge pressing members for pressing strain gauges against the side surface of the object-to-be-measured; and
one or more feed mechanisms for giving a pressing forces to the gauge pressing members, wherein
the holder body includes two or more bracket members, each of the bracket members includes a mating surface for forming an opening in which the object-to-be-measured is to be positioned, all of the bracket members of which mating surfaces are mated with each other are coupled to each other through fastening members to form the opening, the object-to-be-measured is to be positioned in the opening, the holder body is to be mounted on the object-to-be-measured,
at least one of the bracket members includes one or more guide grooves for guiding the gauge pressing member, and
the feed mechanism includes a threaded hole provided in a back surface of the gauge pressing member which is restrained from freely rotating in the guide groove, a bushing having a flange and inserted into a through hole formed in the bracket member, and a feed screw threadedly inserted into the bushing,
the feed screw threadedly inserted into the bushing is threadedly inserted into the threaded hole formed in the back surface of the gauge pressing member to feed the gauge pressing member in the guide groove, and the strain gauge is pressed against the side surface of the object-to-be-measured.

2. The strain gauge holder according to claim 1, wherein the gauge pressing member includes a buffer material composed of an elastic body on a pressing surface of the strain gauge holder.

3. The strain gauge holder according to claim 2, wherein the gauge pressing member includes a recess formed in the pressing surface of the strain gauge holder, and the buffer material is placed in the recess.

4. The strain gauge holder according to claim 3, wherein the recess includes an extra space for the compressed buffer material expansion.

5. The strain gauge holder according to claim 2, wherein the guide groove includes an extra space for the compressed buffer material expansion.

6. The strain gauge holder according to claim 1, wherein the gauge pressing member includes a recess formed in a pressing surface of the strain gauge holder, and the strain gauge is to be placed in the recess.

* * * * *